United States Patent [19]

Uffner et al.

[11] Patent Number: 4,738,998

[45] Date of Patent: Apr. 19, 1988

[54] HOT-MELT ADHESIVE

[75] Inventors: William E. Uffner, Newark; Donald J. Algrim, Reynoldsburg; James R. Gleason, Newark, all of Ohio

[73] Assignee: Owens-Corning Fiberglas Corporation, Toledo, Ohio

[21] Appl. No.: 53,161

[22] Filed: May 21, 1987

Related U.S. Application Data

[63] Continuation-in-part of Ser. No. 867,361, May 23, 1986, which is a continuation-in-part of Ser. No. 407,393, Aug. 12, 1982, Pat. No. 4,591,531.

[51] Int. Cl.$^4$ ............................................. C08C 11/70
[52] U.S. Cl. ......................................... 524/69; 524/64
[58] Field of Search ................................... 524/64, 69

[56] References Cited

U.S. PATENT DOCUMENTS

| | | | |
|---|---|---|---|
| 3,442,841 | 5/1969 | Adelman | 524/69 |
| 3,869,417 | 7/1975 | Kosaka et al. | 524/69 |
| 3,980,598 | 9/1976 | Moorwessel et al. | 524/69 |

*Primary Examiner*—Edith Buffalow
*Attorney, Agent, or Firm*—Patrick P. Pacella; Ronald E. Champion; Ted C. Gillespie

[57] ABSTRACT

Thermal insulating articles are disclosed of the type which comprises a laminate of thermal insulation and a flexible jacket material with the jacket and thermal insulation being directly adhesively adhered to each other by means of a hot-melt adhesive. The hot-melt adhesive employed consists essentially of an asphalt, an ethylene-vinyl acetate copolymer and a wax. Also provided is a hot-melt adhesive which consists essentially of an asphalt, an ethylene-vinyl acetate copolymer and a compatible wax, which is especially useful in adhering paper used as package wrap.

8 Claims, No Drawings

HOT-MELT ADHESIVE

This is a continuation-in-part of Ser. No. 867,361 filed May 23, 1986, which is a continuation-in-part of Ser. No. 407,393, filed Aug. 12, 1982 now U.S. Pat. No. 4,591,531.

TECHNICAL FIELD

The present invention relates to hot-melt adhesives and more particularly to asphaltic-based adhesives. More particularly, in one of its aspects the present invention relates to asphalt based adhesives especially adapted for the use as hot-melt adhesives in manufacturing thermal insulation, such as jacketed pipe insulation. The invention also relates to a propane washed asphalt-based adhesive especially suitable for use in adhering paper package wrap and box closures.

BACKGROUND AND SUMMARY

Thermally insulating articles are well known in the art which comprise a laminated structure of thermal insulation and a flexible jacket with the insulation and jacket being directly adhesively adhered to each other by means of a hot-melt adhesive. One such type of article is pipe insulation, which includes an inner layer of thermal insulation, in the form of a hollow cylindrical member of insulation, usually slitted and opened at one end and usually hinged at the other to facilitate its positioning around pipe for insulation purposes. The thermal insulation typically comprises an inorganic fiber such as, for example, glass or mineral fiber, and a binder, which thermally sets the fibers together with the binder typically being a phenol formaldehyde. Disposed externally of the thermal insulation, and adhesively secured thereto, is a flexible jacket of single-piece construction, which jacket includes an inwardly disposed vapor barrier, typically a metal foil such as, for example, aluminum foil, and an externally disposed paper material. In many instances, the jacket will also include a glass reinforcement, for example, glass scrim, intermediate the vapor barrier, and paper. The jacket is adhesively secured to the thermal insulation by means of a hot-melt adhesive, and the jacket typically employs a pressure sensitive adhesive, which allows for overlapping of longitudinal end portions of the jacket, and by means of the pressure sensitive adhesive allowing for the securing of overlapping portions of the inner surface of one end to the outer portion of an opposite end of the jacket, whereby the pipe insulation can be mounted and secured about the pipe which it is intended to insulate. Such articles are exemplified in U.S. Pat. No. 4,022,248.

In the past, polypropylene has been used as the hot-melt adhesive, but it is generally a relatively expensive material, and there is a need in the art to provide for a more economical hot-melt adhesive, which has all of the needed properties to allow its use in producing the above described thermally insulating articles.

Thus, in accordance with one aspect of the present invention, there is provided an improved hot-melt adhesive especially adapted for use in forming pipe insulation, which adhesive consists essentially of an asphaltene-enriched asphalt, an ethylene-vinyl acetate copolymer and an oxidized microcrystalline petroleum wax.

In another aspect, the present invention provides a lower cost hot-melt adhesive, especially suitable for applications in colder temperatures, which is preferably free from polypropylene and which consists essentially of a propane-washed asphalt, an ethylene-vinyl acetate copolymer and a compatible wax selected from the group consisting essentially of oxidized microcrystalline petroleum wax and non-oxidized waxes, such as paraffin wax, non-oxidized microcrystalline wax, soft polyethylene wax, and hard synthetic crystalline waxes.

DESCRIPTION AND INDUSTRIAL EXPLOITATION

As indicated above, in one aspect the hot-melt adhesives contemplated herein consist essentially of an asphaltene-enriched asphalt, an ethylene-vinyl acetate copolymer and an oxidized microcrystalline petroleum wax.

In another aspect the hot-melt adhesives contemplated herein consist essentially of a propane-washed asphalt, an ethylene-vinyl acetate copolymer and a compatible wax selected from the group consisting essentially of oxidized microcrystalline petroleum wax and non-oxidized waxes, such as paraffin wax, non-oxidized microcrystalline wax, soft polyethylene wax, and hard synthetic crystalline waxes. To some degree the specific wax used will depend upon the vinyl acetate content of the copolymer. Examples of hard synthetic crystalline waxes are Fischer Tropsche waxes and hard polyethylene waxes. For purposes of this specification, soft waxes are those which have softening points below about 200° F. and hard waxes are those with softening points above about 200° F. Preferably the adhesive is substantially free from polypropylene.

In addition to formulations which have a fine balance of properties and are specifically adapted for purposes of forming laminated thermally insulating articles, e.g., pipe insulation as generally described above, the present invention also contemplates adhesives which are employable for a wide variety of applications as a hot melt adhesive. Representative of such other applications are, for example, the use of such adhesives as a hot melt adhesive for box closures, that is, in adhesively securing respective flaps of corrugated containers to each other and for adhering paper wrappers on packages.

In general, the asphalt employed in the present invention is employed as the base material and is a relatively inexpensive material. The ethylene-vinyl acetate copolymer, while generally increasing the viscosity, primarily serves to enhance the low temperature toughness of the adhesive, while the wax serves to decrease the viscosity, and consequently imparts the ability for controlling the flow properties of the adhesive. The proportion of materials employed will vary depending on a specific application, but in general, it will be found that a highly desirable hot-melt adhesive will be obtained by employing the asphalt in an amount of about 35–80% by weight, the wax in an amount of about 5–30% by weight, and the ethylene-vinyl acetate copolymer in an amount of about 15–50% by weight. Especially suitable adhesives were formed by employing an asphalt in an amount of about 50% by weight, oxidized microcrystalline petroleum wax in an amount of about 25% by weight and ethylene-vinyl acetate copolymers in an amount of about 30% by weight.

In the deasphalting of reduced crude oils and vacuum residues, i.e., the deasphalting of residues of refining towers (vacuum or gravity), asphalt is generally viewed as being composed of three fractions, namely, an asphaltene fraction, a resin fraction and an oil fraction. These fractions are typically analyzed by the Corbett analysis or Streeter analysis. Solvent extraction techniques, for example, with the use of C$_3$–C$_5$ alkanes are known for such deasphalting and leave asphalt residues high in asphaltene content. Thus, the term "asphaltene-enriched asphalt" as used herein contemplates the use of those asphalts in which the asphaltene content has been enriched relative to the reduced crude oil and/or vacuum residue feedstock. While such asphaltene-enriched asphalt still contains resin and oil fractions, the asphaltene content of such asphaltene-enriched asphalts will be larger than either the amount of resin or the amount of oil therein. Typically, such an asphaltene-enriched asphalt will show the presence of in excess of about 40% of asphaltenes, less than about 27% resin and less than about 33% of oil. Such materials are relatively inexpensive because the materials essentially occur as the residual by-product of processes which are intended to extract the higher value resin portion and the higher value oil portion. One such suitable material is available from Pester Refining Company and, in general, materials which are outstandingly adapted for the present purposes are the asphaltene fraction, i.e., the asphaltene-enriched asphalt residual product, of the ROSE process, i.e., the residuum oil supercritical extraction process, for example, that developed by Kerr-McGee Refining Corporation. Typically, such asphaltene-enriched asphalts are very hard and have a penetration (77° F.) of less than about 1 and, quite frequently, substantially a zero penetration. Their softening points are in excess of about 190° F. and typically about 190° F. to about 300° F.

Other compositions of the invention contain from about 35–80% propane-washed asphalt, 5–30% wax and 15–50% ethylene-vinyl acetate copolymer. Preferred compositions contain from about 45% to about 65% propane-washed asphalt, from about 20% to about 35% ethylene-vinyl acetate, and from about 15% to about 25% of a compatible wax. In several specific preferred compositions, the ethylene-vinyl acetate and the compatible wax are present in about equal amounts. An especially suitable, lower cost adhesive consists essentially of about 58% propane-washed asphalt, and about 21% each of an ethylene-vinyl acetate copolymer and a compatible wax.

The propane-washed asphalts of the instant invention are those obtained from a propane extraction process used in crude oil refining. These asphalts typically have softening points ranging from about 150° F. to about 210° F. and have penetrations from 0 to about 10. Typically, these propane-washed asphalts have in excess of about 80% resins, less than about 10% oil and less than about 10% asphaltenes, by weight, as determined by a Corbett analysis. The Corbett analysis or fractionation is based on the method published by L. Corbett in "Analytical Chemistry", Volume 41, No. 4, 1969. Suitable asphalts are commercially available from Atlas Refining Company in Shreveport, La. Another suitable material is an asphalt resin commercially available from Borcke Associates, Inc. (Great Neck, N.Y., U.S.A.) as Borcke ® 3150 resin.

Any ethylene-vinyl acetate copolymers can be employed. The amount of vinyl acetate present in these copolymers may vary over wide ranges but it is generally preferred to employ such copolymers wherein the vinyl acetate is present in an amount of about 9 to about 60% by weight.

For those adhesive formulations containing the asphaltene-enriched asphalt, suitable commercially available ethylene-vinyl acetate copolymers include "Elvax" resins from the E.I. duPont de NeMours Company, and are also available from USI Chemicals under the trade designation "Ultrathene" and "Vynathene" copolymers. Especially fine results have been obtained by employing vinyl acetate contents in the range of about 39–42% by weight.

Typical ethylene-vinyl acetate copolymers can be used in the adhesive formulas containing the propane-washed asphalt and they include duPont 40W copolymer which contains about 40% vinyl acetate and has a melt index of about 65, duPont 350 copolymer, which contains about 25% vinyl acetate and has a melt index of about 18, and U.S. Industrial Companies' Ultrathene and Vynathene copolymers, particularly EY902-30 copolymer, which contains 40% vinyl acetate. The melt index of the ethylene-vinyl acetate copolymers, which is indicative of molecular weight, can range from about 2 to about 400 with a preferred range of from about 7 to about 150, and a most preferred range of from about 15 to about 60.

The oxidized microcrystalline petroleum waxes used for forming the hot melt adhesive to adhere the metal foil portion, e.g., aluminum foil, of a flexible jacket to the inwardly disposed thermal insulation in forming pipe insulation are well known waxes and are commercially available, for example, from the Bareco Division of Petrolite Corporation. Exemplary of suitable oxidized microcrystalline petroleum waxes are those having acid numbers generally in the range of about 5 to about 50 and melting points generally in the range of about 190°–225° F. (88°–107° C.). The wax must be compatible with the other two constituents. This compatibility can be easily checked by simply blending the ingredients at an elevated temperature and then casting films therefrom. Compatibility will be indicated by the films exhibiting a homogeneous substantially single phase characteristic.

For those adhesives containing the propane-washed asphalt, any suitable wax may be utilized which (1) reduces the viscosity of the adhesive mix when the wax is in its molten state; (2) eliminates tack at room temperature, i.e., the adhesive surface becomes waxy and non-sticky; and (3) decreases the viscosity of the adhesive to aid in bonding the adhesive to the substrate as the wax solidifies upon cooling. In addition to the oxidized microcrystalline waxes described above, other suitable waxes include non-oxidized waxes such as paraffin wax, non-oxidized microcrystalline wax, and soft polyethylene wax. Since non-oxidized waxes are typically lower in cost than oxidized waxes, a lower cost adhesive product is provided by those formulas containing these waxes. Commercially available non-oxidized waxes include paraffin wax known as Shellwax 300 from Shell Chemical Company (Houston, Tex., U.S.A.), non-oxidized microcrystalline waxes known as Shellwax 400 and Shellwax 500 from Shell Chemical Company (Houston, Tex., U.S.A.) and soft polyethylene wax known as Polywax 500 from the Bareco Division of Petrolite Corporation in Tulsa, Okla. Generally, the more polar oxidized microcrystalline petroleum waxes are compatible with ethylene-vinyl acetate copolymers of higher vinyl acetate content, i.e., on the order of from about 35 to about 50%. Non-oxidized waxes, such as microcrystalline waxes, paraffin waxes, and soft polyethylene waxes, generally are compatible with the less polar ethylene-vinyl acetate copolymers of lower acetate content, i.e., on the order of about 15% to about 35% vinyl acetate.

Hard synthetic crystalline waxes used in the invention preferably have a softening point above about 200° F. and a pen of about 1 or 2. Preferably, these waxes have a softening point within the range of from about 195° F. to about 280° F., and most preferably within the range of from about 210° F. to about 260° F. Examples are Polywax 1000 by Petrolite and Paraflint H-1 by Moore & Munger. Other examples are hard, high-melting linear high density waxes having N-parafinic type structures, such as Petrolite C4040. These hard crystalline waxes are all synthesized in a catalytic process, rather than being a by product of distillation, and are highly stereoregular. The Paraflint H-1 wax is made by the well known Fischer Tropsche process, which uses transition metal catalysts.

It has been found that the hard synthetic crystalline waxes of this invention produce greatly improved results in the upper and lower bonding limits. This reduces the closure failure when the adhesive is used in packaging. The upper and lower bonding limits are tested in accordance with testing methods T-3005 and T-3004, respectively, as prescribed by the Adhesive Committee of the Packaging Institute, U.S.A., 342 Madison Avenue, N.Y., N.Y. 10097.

The compositions of the present invention may include other additives, such as anti-oxidants, which will increase the shelf life and weatherability of the adhesive compositions by retarding time-related viscosity changes and subsequent discoloration. Fillers may also be incorporated into the composition, particularly inert fillers such as clay or calcium carbonate to reduce the cost of the compositions, to lower the tack of the compositions and to add dimensional stability by reducing the flow of the composition under pressure. Such fillers also will reduce "blocking" or adhesion of the adhesive composition in the package before installation. The compositions given herein are all given as parts by weight, and do not include filler.

The hot-melt adhesives are quite easily formulated, but, in general, it is preferred to add the asphalt to a heated-agitated reactor and then heat the asphalt to above its melting point, preferably to a temperature on the order of about 200° C. at which time the wax and the ethylene-vinyl acetate copolymer are slowly added, allowing them to melt and then homogenizing the mixture by mixing for about 2-4 hours.

Adhesives formulated in accordance with the present invention will exhibit good bonding to paper and metallic vapor barrier foils, and especially to aluminum, and they will also exhibit good wetting out of such paper and foils. Additionally, such compositions, when employed to bond to aluminum foil of a flexible jacket to thermal insulation, will show good adhesion over a temperature range from about −20° F. to about 180° F. Generally, such formulations will exhibit good low temperature flex at about 30°-35° F. and even as low as 20° F. Another outstanding feature of the present compositions is the fact that they are non-blocking, or free flowing, when formed into solid shapes, for example, shapes in which the cross section is generally rectangular. This is quite important because, as indicated above, these compositions are intended for use as hot melts and, generally, in the manufacture of such materials, the hot melt is first cast and then cut into solid articles which are then stored and fed to a heating unit where they are melted. It consequently becomes quite important that these materials be free flowing, or non-blocking, to provide for an economical expedient operation.

While the above describes the present invention with sufficient particularity, the following is intended to further exemplify the present invention.

EXAMPLE 1

As represented in Table I, three samples were prepared using the proportions of materials indicated therein. These hot melts were prepared by melting asphaltene-enriched asphalt in a reactor equipped with an agitator. Once the asphalt was melted, the ethylene-vinyl acetate copolymer and the indicated waxes were added slowly with agitation to ensure good wetting and mixing.

The test results in Tables I and III were obtained by using the following methods:

Softening Point
 Ring and ball method, ASTM No. D-36.
Cold Flex
 To test for low temperature flexibility, samples of the adhesive were made measuring about 1 inch by 6 inches and 0.050 inches thick. The samples and a mandrel were conditioned in a thermatron for approximately ½ hour. The samples were then bent around the mandrel for a period of 2 seconds. This was repeated for a total of 3 samples. The temperature was lowered by 2° F. and the test repeated. The low temperature flex was reported as the lowest temperature where all three samples passed the test, i.e., did not crack when bent around the mandrel.
Tack
 Tack determined by touch.
Blocking
 The adhesive was processed into small chips and placed in a container in an oven at 115° F. for 16 hours, and then cooled to room temperature. Blocking was determined by observing whether pieces stuck together or were free flowing, i.e., not stuck together.
Upper Bonding Limit
 The ends of two strips of Kraft paper, approximately 1" in width, were glued together using the adhesive. Once the adhesive was set, the free end of one paper strip was attached to a 0.5 lb. weight while the free end of the other paper was suspended. The temperature was raised and the temperature at which the bond failed was recorded as the upper bonding limit.
Viscosity
 ASTM No. D-4402
Smoke
 A container of an adhesive sample was placed in an oven at 300°-400° F. The adhesive was stirred and the amount of smoke generated was qualitatively observed.
Elongation
 A 3/16" thick sample of adhesive was folded over on itself and the stress on the outside radius of curvature was qualitatively observed for cracking.
Hand
 Hand was determined by how the adhesive felt to the touch of the hand, soft or hard.

TABLE I

| | Sample (%) | | |
|---|---|---|---|
| | 1 | 2 | 3 |
| Material | | | |
| Elvax 40P copolymer (duPont) | 25 | — | 19.5 |
| Asphaltene enriched asphalt (Softening Point 216° F.) | 50 | 50 | 54.5 |
| Cardis 320 wax (Petrolite) | 25 | 25 | 26.0 |
| Vynathene EY-902-30 copolymer (USI) | — | 25 | — |

TABLE I-continued

| | Sample (%) | | |
|---|---|---|---|
| | 1 | 2 | 3 |
| Viscosity (cps.) at | | | |
| 350° F. | | 3200 | 3100 |
| 375° F. | | 2180 | 2100 |
| 400° F. | | 1550 | 1500 |
| 350° F. | | 3200 | 3080 |

Once the materials were all added, the ingredients were blended by heating at about 200° C. for about 2-4 hours, after which time the reactor was emptied and the composition was cast into sheets. The sheets were then cut into shapes, generally having a rectangular cross-section, and then were employed as a hot melt for purposes of adhesively securing the flexible jacket having an inner aluminum foil vapor barrier to thermal insulation. It was first of all noticed theat the shapes were non-blocking in that they exhibited good free flow with no unacceptable adhesion of the respective shapes to each other. The samples showed excellent wet out of the aluminum foil and provided a good bond between the aluminum foil and the thermal insulation in the temperature generally of about −20 F. to about 180° F.

EXAMPLE 2

An additional sample, 4, was prepared in the proportions of Table II below, using the preparation technique of Example 1, set forth above. Table III summarizes the properties of Samples 3 and 4.

TABLE II

| Material | Sample 4 (Wt. %) |
|---|---|
| Propane-washed Asphalt (Atlas A) | 58.3 |
| EVA Copolymer (duPont 350) | 20.8 |
| Paraffin, non-oxidized wax (Shellwax 300) | 20.8 |

TABLE III

| Property | Sample 3 | Sample 4 |
|---|---|---|
| Softening Point (°F.) | 186 | 168 |
| Cold Flex (°F.) | 31 | 16 |
| Tack | None | None |
| Blocking | Very Slight | None |
| Upper Bonding Limit (°F.) | 148–150 | 152–154 |
| Viscosity (cps) at 350° F. | 1100 | 1000 |
| Smoke | Slight | None |
| Elongation | Good | Good |
| Hand | Firm | Firm |

As can be seen from the above results, the adhesive containing the propane-washed asphalt had a lower viscosity and softening point than adhesive(s) containing asphaltene-enriched asphalt. Also, the adhesive with propane-washed asphalt demonstrated improved thermal, blocking and smoke properties.

The adhesive containing propane-washed asphalt gave slightly improved thermal performance. This adhesive remained flexible at lower temperatures and stayed adhered at slightly higher temperatures. This means that once this adhesive forms a seal, it can withstand relatively lower and higher temperatures before cracking or failing. These are desirable characteristics for an adhesive, especially when used to seal containers exposed to varying temperatures and temperature extremes during storge and use.

Additionally, these adhesives provide improved processing properties. They are non-blocking which permits easy handling for use as a hot-melt adhesive, and they are non-smoking which is both a processing and environmental advantage.

Other advantages of adhesives containing the propane-washed asphalt have been observed. These adhesives have a relatively lower softening point and have demonstrated better wet-out properties. When applied to paper, the adhesive penetrates into the paper or "wets-out" better, thus enabling the adhesive to form a stronger bond. Also, the adhesive has been observed to stay liquid longer, without a film forming on the top surface, when applied to objects being sealed, such as paper wrappers, in relatively cooler temperatures. This means that the adhesive will bond better in cooler temperatures, which is an advantage when adhesive application to containers takes place in a cold packaging facility.

EXAMPLE 3

Five additional samples using hard synthetic crystalline waxes were prepared according to the proportions given in Table IV. The properties of Samples 5–9 are given in Table V.

TABLE IV

| | 5 | 6 | 7 | 0 | 9 |
|---|---|---|---|---|---|
| Atlas A | 50 | 50 | 57 | 55 | 50 |
| duPont 230 | 30 | 30 | — | 30 | 30 |
| duPont 250 | — | — | 23 | — | — |
| Petrolite C4040 | — | 20 | — | — | — |
| Paraflint H-1 | 20 | — | 20 | 15 | — |
| Polywax 1000 | — | — | — | — | 20 |

TABLE V

| | 5 | 6 | 7 | 8 | 9 |
|---|---|---|---|---|---|
| Softening Point (°F.) | 226 | 226 | 216 | 220 | 235 |
| Tack | None | None | None | None | None |
| Blocking | None | None | None | None | None |
| Upper Bonding Limit (°F.) | 185 | 185 | 175 | 160 | 170 |
| Lower Bonding Limit (°F.) | −20 | −20 | 0 | −20 | 0 |
| Viscosity (cps) at 350° F. | 1450 | 1450 | 1555 | 1525 | 1610 |
| Smoke | None | None | None | None | None |
| Elongation | Good | Good | Good | Good | Good |
| Hand | Firm | Firm | Firm | Firm | Firm |
| Set Time | Fast | Fast | Fast | Fast | Fast |

It can be seen that samples 5–9 had higher softening points and increased upper bonding limits when compared with Samples 3 and 4. Also the lower bonding limits of Samples 5–9 are equal to or superior to those of Samples 3 and 4, which have a lower bonding limit of about 0° F. Further, the set times of samples 5–9 are fast, and therefore superior to the set times of examples 3 and 4, which are slow.

While the above describes the present invention, it will, of course, be apparent that modification is possible which, pursuant to the patent statutes and laws, do not depart from the spirit and scope thereof.

We claim:

1. A hot-melt adhesive which consists essentially of from about 35% to about 80% by weight of propane-washed asphalt, from about 15% to about 50% by weight of an ethylene-vinyl acetate copolymer, and from about 5% to about 30% of a compatible wax selected from the group consisting essentially of oxidized microcrystalline wax, paraffin wax, non-oxidized microcrystalline wax, soft polyethylene wax and hard synthetic crystalline wax.

2. The hot-melt adhesive of claim 1 consisting essentially of about 45% to about 65% propane washed asphalt, about 20% to about 35% ethylene-vinyl acetate copolymer, and about 15% to about 25% hard synthetic crystalline wax.

3. The hot-melt adhesive of claim 2 in which the hard synthetic crystalline wax has a softening point within the range of from about 195 to about 280.

4. The hot-melt adhesive of claim 3 in which the hard synthetic crystalline wax is from the group consisting essentially of hard polyethylene waxes, Fischer Tropsche waxes and hard, high melting linear high density waxes having N-parafinic-type structures.

5. The hot-melt adhesive of claim 4 which is substantially free from polypropylene.

6. The hot-melt adhesive of claim 5 consisting essentially of about 50% propane washed asphalt, about 30% ethYlene-vinyl acetate copolymer, and about 20% Paraflint H-1.

7. A hot-melt adhesive which consists essentially of from about 45% to about 65% propane-washed asphalt, from about 20% to about 25% ethylene-vinyl acetate copolymer, and from about 20% to about 30% of a compatible wax, the wax being either an oxidized microcrystalline petroleum wax where the ethylene-vinyl acetate copolymer contains at least about 35% vinyl acetate, or the wax being selected from the group consisting essentially of paraffin wax, non-oxidized microcrystalline wax, soft polyethylene wax and hard sYnthetic crystalline wax where the copolymer contains less than about 35% vinyl acetate.

8. A hot-melt adhesive which is free of polypropylene and which consists essentially of about 58% propane-washed asphalt, about 21% ethylene-vinyl acetate copolymer and about 21% non-oxidized paraffin wax.

* * * * *